Figure 1:
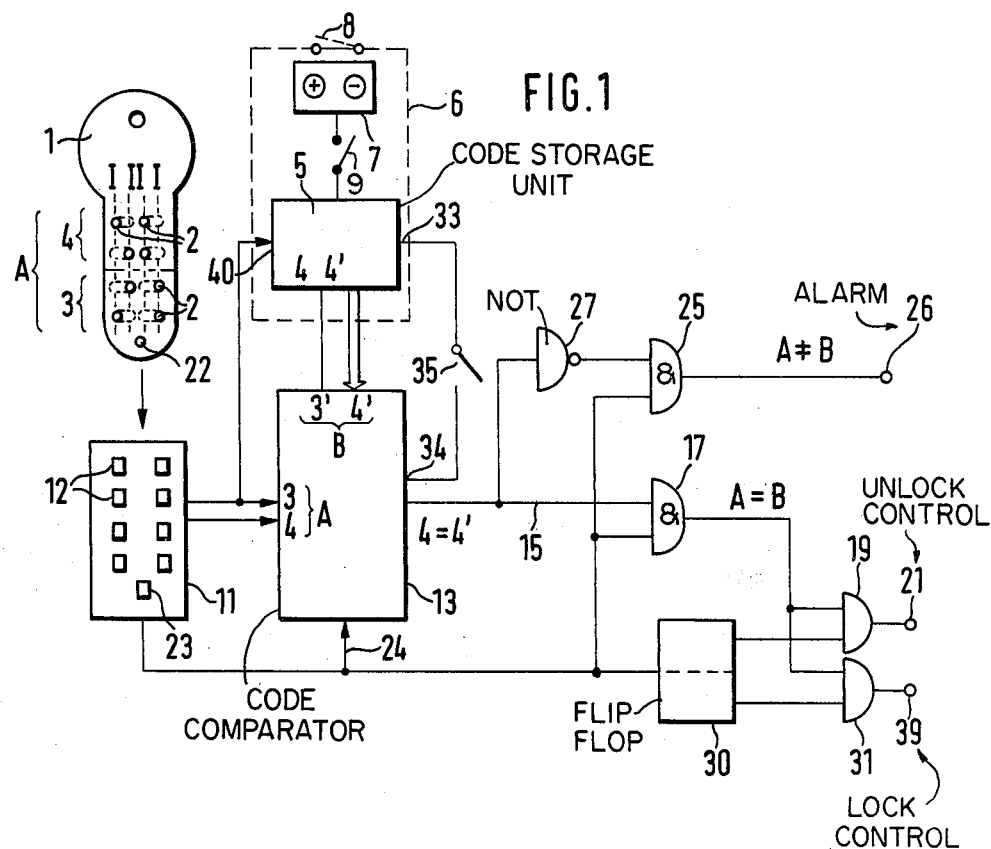

United States Patent [19]

Weishaupt et al.

[11] 4,347,545
[45] Aug. 31, 1982

[54] BURGLARPROOFING DEVICE FOR AUTOMOTIVE VEHICLES

[75] Inventors: Walter Weishaupt, Munich; Hans-Dieter Fournell, Haar, both of Fed. Rep. of Germany

[73] Assignee: Bayerische Motoren Werke A.G., Munich, Fed. Rep. of Germany

[21] Appl. No.: 169,359

[22] Filed: Jul. 16, 1980

[30] Foreign Application Priority Data

Jul. 18, 1979 [DE] Fed. Rep. of Germany ....... 2928913

[51] Int. Cl.³ .............................................. H01H 47/34
[52] U.S. Cl. ...................................... 361/172; 70/278; 180/287; 307/10 AT; 340/542; 340/825.32
[58] Field of Search ................... 361/171, 172; 70/278, 70/413; 340/63, 64, 147 MD, 542, 543; 180/287; 307/10 AT

[56] References Cited

U.S. PATENT DOCUMENTS 4,207,555 6/1980 Trombly ......................... 361/172 X

FOREIGN PATENT DOCUMENTS 2726737 12/1978 Fed. Rep. of Germany ...... 361/172
2753381 6/1979 Fed. Rep. of Germany ........ 70/278

Primary Examiner—Reinhard J. Eisenzopf
Attorney, Agent, or Firm—Craig & Antonelli

[57] ABSTRACT

A burglarproofing device for vehicles is provided wherein a key contains two partial codes. Device on the vehicle compares at least one of the two partial codes with a stored code. Coincidence of the codes will unlock a central locking device. A partial code may be changed by the authorized owner, although the vehicle is locked.

18 Claims, 3 Drawing Figures

BURGLARPROOFING DEVICE FOR AUTOMOTIVE VEHICLES

The invention relates to a burglarproofing device for automotive vehicles with a code transmitter for a settable or adjustable code, with a code storage unit for a stored code corresponding to the settable code, with a code reader, and with a code comparator, which latter makes it possible to use the automotive vehicle in case of coincidence between the settable code and the stored code.

In a conventional burglarproofing device of this type, the code transmitter is fashioned as a key and provided with magnetic or optical coding as disclosed in German Unexamined Laid-Open Application DOS No. 2,726,737. Upon insertion of the key in the code reader, the code comparator examines the code of the code transmitter with the stored code. If the two codes do not conform to each other, an optical and/or acoustic alarm is triggered and/or an auxiliary mechanism of the automotive vehicle, such as, for example, the starter or the ignition, is rendered inoperative.

A code transmitter fixedly connected to the automotive vehicle is furthermore conventional, made up of several axially rotatable disks with contacts or the like, the adjustment of which yields a code as disclosed in DOS No. 1,905,339.

In these safety devices against burglarizing, the stored code cannot be changed. This can be copied, for example, when the vehicle is in the shop. In such a case, the safety device can be turned off by unauthorized persons, and the vehicle can be used by them.

The invention provides a burglarproofing safety device of the type mentioned hereinabove, wherein an unauthorized use of the automotive vehicle is made more difficult.

The invention attains the foregoing by employing a stored code consisting of two partial codes, of which the first partial code can be re-stored or charged in the rest condition of the safety device and in case of coincidence of the second partial code with the corresponding partial code of the code transmitter.

By the bipartition of the code, an objective is obtained in that a change of the stored code is only possible for the owner of the code transmitter belonging to the respective safety device. Only if the stored, second partial code coincides with the corresponding partial code of the code transmitter is it possible to alter the stored code by changing the first partial code. For this purpose, the code transmitter is, for example, inserted in the code reader, and the first partial code is transferred into the code storage unit. The second partial code remains unchanged during this step. In contrast to an alteration of the entire code, the stored code cannot be re-stored or changed by an unauthorized person in the rest condition, either; for such re-storing or changing could be effected in case of a code trasmitter constructed as a key by means of a code transmitter of the same construction, and in case of a code transmitter fixedly connected to the automotive vehicle by setting any desired code.

The first partial code can be altered in a simple way before the automotive vehicle is opened up. For this purpose, the code reader can be arranged in the outer paneling of the automotive vehicle and accessible from the outside. The first partial code can then be changed even after leaving the automotive vehicle, but only by an authorized person.

A further improvement in protection against burglary for the automotive vehicle is made possible by providing that, additionally, the second partial code can be re-stored or changed independently of the re-storing or changing of solely the first partial code. This re-storing or changing of the second partial code can be made difficult to carry out, in contrast to the first partial code, to prevent in this way an inadvertent resetting of the second partial code. For this purpose, a switch can be provided, for example, upon the activation of which only the second partial code can be altered, for example by insertion of the code transmitter in the code reader. Thereby a reprogramming of the entire code in the rest condition of the safety device by an unauthorized person is made practically impossible. A prerequisite for an alteration of the first partial code which is possible only in the rest condition of the safety device is, as set forth above, the coincidence of the stored value and the value input by the code transmitter of the second partial code, whereas, for altering the second partial code, which is likewise possible only in the rest condition, a coincidence of the entire stored code with the settable code is required.

The alteration of the second partial code is made difficult for an unauthorized person, for instance, by providing that this partial code is re-storable or changeable only after the automotive vehicle has been opened. Even if the unauthorized person is accidentally in possession of the first or second partial code, he cannot open the automotive vehicle in the operative condition of the safety device if there is no coincidence between the stored partial code and the set, other partial code.

A reprogramming of the second partial code is made additionally difficult by the features that a central locking mechanism is controlled by the code comparator, and that the second partial code can be re-stored or changed after opening a hood or door of the automobile. Only in the case the safety device is in the rest condition does the central locking mechanism make it possible to open the hood or door, whereas, in the operative condition, the unauthorized opening of the hood or door, for example, results immediately in a triggering of the alarm.

Another embodiment of the safety device resides in that the code storage unit is a volatile storage unit connected to an energy storage means, especially the vehicle battery. The code storage unit and the vehicle battery can be accessible, for example, by way of a common door. The erasing of the code storage unit can be effected in a simple manner by disconnecting the vehicle battery.

It may also be advantageous for the vehicle user to make the changing of the second partial code difficult. For this purpose, the code carrier is provided with a releasable, mechanical blocking means for the second partial code. This feature prevents that, for example, during the changing of the first partial code also the second partial code is inadvertently reset on the code transmitter, and an alarm is accidentally triggered during the deactivation of the safety device.

Accordingly, an object of the present invention is to provide a burglarproof vehicle system employing two partial codes whereby a code may be changed.

Another object of the invention is to provide a burglarproof vehicle system employing two partial codes whereby only a vehicle owner may change a first partial code upon condition that the second partial code input by way of a code transmitter coincides with a corresponding stored second partial code.

Another object of the invention is to provide a burglarproof vehicle system employing two partial codes wherein one partial code may be changed when the vehicle is in a locked condition.

Another object of the invention is to provide a burglarproof vehicle system employing two partial codes wherein a partial code may be altered under control of a switch disposed between a comparative means and a partial code storage means.

Another object of the invention is to provide a burglarproof vehicle system wherein two partial codes are employed wherein alteration of one partial code can be effected only under conditions of coincidence of both partial codes when transmitted by a code transmitter when compared with both partial codes as stored in the system.

Another object of the invention is to provide a burglarproof vehicle system employing two partial codes which are stored independently of each other.

Another object of the invention is to provide a burglarproof vehicle system of two partial codes whereby an unauthorized person in possession of either but not both partial codes cannot open the vehicle.

Another object of the invention is to provide a central locking mechanism controlled by code storage wherein access to said storage to change a partial code is achieved by way of opening the hood of the vehicle.

Another object of the invention is to provide a burglarproof vehicle system wherein a condition of noncoincidence by transmitted and stored first and second partial codes triggers an alarm.

Another object of the invention is to provide a burglarproof vehicle system wherein partial codes are stored in a volatile storage connected to the vehicle battery and wherein the codes are eraseable by disconnecting the storage and the battery.

Another object of the invention is the provision of a code transmitter for a burglarproof vehicle system employing two partial codes wherein a first partial code may be modified in the transmitter without inadvertently modifying the second partial code.

Figure 2:
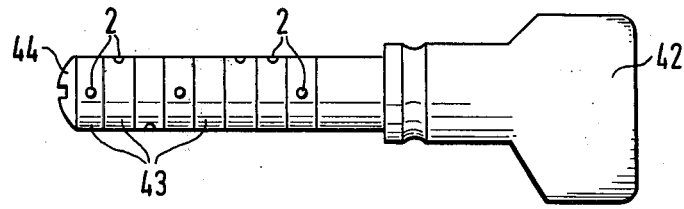
Figure 3:
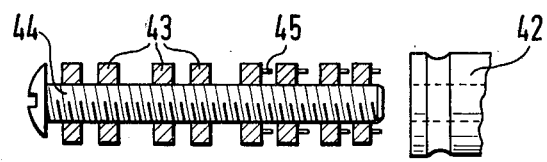

These and other objects, features and advantages of the present invention will become more apparent from the following description when taken in connection with the accompanying drawing, which shows, for the purpose of illustration only, one embodiment in accordance with the present invention, and wherein:

FIG. 1 is a block circuit diagram of a burglarproofing device for automotive vehicles, FIG. 2 shows an associated key serving as the code transmitter, and FIG. 3 shows the mechanical structure of the key according to FIG. 2.

In FIG. 1, a code transmitter, illustrated schematically as a key 1, is provided with a settable code consisting of several, mutually independently adjustable parts 2, such as, for example, magnets or laminae or balls. The parts 2, illustrated as circles and totaling eight, are adjustable into two positions I and II, respectively. The parts 2 located in the front portion of the key 1 constitute a first partial code 3; the remaining parts 2 constitute a second partial code 4.

Partial codes 3' and 4', corresponding to the two partial codes 3 and 4, are furthermore contained in a code storage unit 5 located in the interior of the automobile, for example in the engine space 6 and connected to the vehicle battery 7. The code storage unit and the vehicle battery, likewise located in the engine space 6, are accessible by way of an engine hood 8. The code storage unit 5 is constructed as a volatile memory. It may include storage elements for registers to store corresponding partial codes such as 3' and 4'. Each bank of registers admits storing data representing a partial code. Additional inputs 33 and 40 will be described subsequently.

The key 1 is insertable in a code reader 11 arranged in the outer paneling of the automobile. The code reader 11 possesses for each part 2 a sensor 12 which, in case of magnetic parts, is, for example, respectively one reed contact. The latter is normally open, and closes only if the associated magnet is in position I. In case of parts 2 made in the form of laminae or balls, light barriers are provided instead of reed contacts, which barriers can be interrupted by the parts in position I. Parts 2 each present code in binary form. The entire code composed of the two partial codes 3 and 4 thus comprises plural binary representations.

The code storage unit 5 and the code reader 11 are connected to a code comparator 13 which compares the settable code A consisting of the partial codes 3 and 4 with the corresponding stored code B consisting of corresponding partial codes 3' and 4'. In accordance with logical processes known in the art, such comparison may take the form of a subtraction operation, for example, the data elements of the partial codes 3 and 4 being subtracted from the corresponding data elements of the stored partial codes 3' and 4', or vice versa. If codes A and B agree, the code comparator 13 transmits a switching signal via a line 15 which is fed via an AND-gate 17 and an AND-gate 19 to a control output 21. The unlocking input of an electrical central locking mechanism is connected to the control output 21.

The key 1 contains a fixedly installed, additional contact 22 associated with a sensor 23 of the code reader 11. This sensor 23 detects whether the key 1 has been completely inserted in the code reader 11. The sensor 23 is connected to a release input 24 of the code comparator 13 and to the AND-gate 17, which latter is thus conductive for the switching signal of the code comparator 13 only when the key 1 has been entirely introduced. That is to say, the absence of a release input signal at 24 will prevent a comparison in 13 from taking place, and thus no signal can be output to line 15.

If the key is completely inserted in the code reader 11, but code A does not coincide with code B, an output 26 for an alarm unit connected thereto is triggered via an AND-gate 25. The AND-gate 25 is fed with the release signal of the sensor 23 and, via a negator or NOT element 27, with the signal from line 15 which, in case of disagreeing code signals A and B, is at zero potential.

The electrical central locking mechanism connected to output 21 is opened by the signal from output 21. The AND-gate 19 blocking this output is connected to the output of a flip-flop 30 responding to a change in the condition of the release signal from a sensor 23, and to the output of AND gate 17. The output of flip-flop 30 is also connected to one input of AND-gate 31, the other input of which is likewise connected to the AND-gate 17. The AND-gate 31 controls the locking of the central locking mechanism connected to the output 32 of the AND-gate.

The partial code 3 of the key 1 is transmitted to a reading input 40 of the code storage unit 5 and, in the rest condition of the safety device, upon agreement of the second partial code 4 with the stored partial code 4', can be read into the code storage unit 5 and there can be stored as a new, first partial code. For this purpose, the code storage unit is provided with a further signal input 33 which is connected via a switch 35 to a signal output 34 of the code comparator 13. The switch 35 is closed in the rest condition of the safety device. This rest condition is set, for example, by inserting key 1, provided with partial code A, in the code reader 11, if code A coincides with stored code B. The signal output 34, on the other hand, yields a signal only if the partial code 4 coincides with the stored partial code 4'.

In addition to this alteration of code A, which can be effected in a simple way merely by changing partial code 3, it is possible also to alter the partial code 4. For this purpose, the engine hood 8 is to be opened, in the rest condition of the safety device, and the code storage unit 5 is to be disconnected at 9 from the vehicle battery 7. As will be understood by practitioners in the art, this can be affected by a switch as at 9 in FIG. 1. Thereby the entire stored code B is erased, and after reestablishing the connection between the vehicle battery 7 and the code storage unit, for example by insertion of the key 1, provided with an altered code A, in the code reader, this code B can be changed.

The key 1 shown in FIGS. 2 and 3 comprises a handle 42 and eight rotatable disks 43 held by a screw 44 inserted in the handle 42. The disks 43 carry respectively one magnet along their outer circumference, constituting part 2 (see FIG. 1), and form the two partial codes 3 and 4 on the basis of their rotational position.

For the easy alteration of partial code 3 possible at any time, the four first disks 43 can be adjusted in their rotational position by hand without any special preparation. Each of these disks 43 is adjustable for this purpose against the force of an internally located spring, not shown, by respectively one quarter revolution about the screw 44.

The additional four disks 43 forming the partial code B are likewise variable in their rotational position to alter this partial code. However, to prevent an unintentional adjustment of these disks, for example during a change of the partial code A, these disks are provided with locking pins 45 engaging into bores of the adjacent disk or of the handle 42. The disks forming the partial code B can be rotated with respect to one another only if the screw 44 is turned out of the handle 42 to such an extent that the locking pins 45 come out of engagement with the bores.

On account of the possibility of altering both partial codes independently of each other and in various ways, safety against an unauthorized utilization of the automobile has been considerably enhanced. Of course, the aforedescribed safety device can also be employed for other purposes, for example to burglarproof apartments or the like.

The particular description employed is exemplary only and it will be apparent to those skilled in the art that other procedures employing different sequences of steps, other paramaters and other indications, may be employed without departing from the spirit of the invention disclosed. Therefore, we do not wish to be limited to the details described herein but intend to cover all such modifications as are encompassed by the scope of the appended claims.

What is claimed is:

1. Burglarproofing device for automotive vehicles with a code transmitter for a settable code, with a code storage unit for a stored code corresponding to the settable code, with a code reader, and with a code comparator, which latter makes it possible to use the automotive vehicle in case of coincidence between the settable code and the stored code, characterized in that the stored code consists of two partial codes, of which the first partial code can be re-stored in the rest condition of the device and upon coincidence of the second partial code with the corresponding partial code of the code transmitter.

2. Burglarproofing device according to claim 1, characterized in that the first partial code can be re-stored before the automotive vehicle is opened.

3. Burglarproofing device according to claim 1 or 2, charaterized in that additionally the second partial code can be re-stored while modification of the first partial code is blocked.

4. Burglarproofing device according to claim 3, characterized in that the second partial code can be re-stored after opening of the automotive vehicle.

5. Burglarproofing device according to claim 4, characterized in that a central locking mechanism is controlled by the code comparator, and that the second partial code can be re-stored after opening a hood or door of the automotive vehicle.

6. Burglarproofing device according to one of claims 1 or 2, characterized in that the code storage unit is a volatile memory connected to the vehicle battery.

7. Burglarproofing device according to claim 6, characterized in that the code storage unit can be erased by disconnecting the vehicle battery.

8. Burglarproofing device according to one of claims 1 or 2, characterized by a mechanical blocking mechanism for the second partial code of the code transmitter.

9. In a burglarproofing system employing first, second, third and fourth partial codes for locking and unlocking a central locking mechanism for a vehicle, the method of
storing first and second partial codes,
receiving third and fourth partial codes,
comparing said first and third partial codes for coincidence,
comparing said second and fourth partial codes for coincidence, producing a first output upon coincidence being established in said comparison steps, and
unlocking said central locking mechanism in response to said output.

10. The subject matter of claim 9, wherein said system employs a code transmitter and wherein said receiving step is responsive to said third and fourth partial codes established by said code transmitter.

11. The subject matter of claim 10, wherein said system employs a code reader cooperable with said code transmitter, said code transmitter having a fifth code receivable by said code reader only upon complete cooperation of said code transmitter with said code reader, comprising the additional step of
releasing said output signal from said comparator in response to receipt of said fifth code by said code reader.

12. The subject matter of claim 10, comprising the further steps of
changing said established first and third partial codes of said transmitter, and blocking the changing of said second and fourth partial codes during said changing step.

13. The subject matter of claim 9, comprising the additional step of
changing a first and third partial code only upon coincidence of said second and fourth partial codes.

14. The subject matter of claim 9, comprising the additional step of
changing said second and fourth partial codes independently while blocking change of said first and third partial codes.

15. The subject matter of claim 9 wherein a code storage for at least one partial code is provided within a closeable compartment of said vehicle, the said code storage being accessible only by opening said compartment, comprising the additional steps of
opening said compartment, and
changing said stored partial codes after said step of opening.

16. The subject matter of claim 15, wherein said changing step comprises the following step:
changing said second and fourth partial codes only in response to coincidence of said first and third partial codes.

17. The subject matter of claim 15, wherein said vehicle has a battery, said storage is volatile and is connected to said battery, and further comprising the step of
clearing said storage by disconnecting said storage from said battery.

18. The subject matter of claim 9, comprising the additional step of
sounding an alarm when said output indicates a lack of coincidence in response to said comparing steps.

* * * * *